F. A. GOOLD & W. G. BAXTER.
CRANK CASE SUPPORT.
APPLICATION FILED SEPT. 12, 1917.
1,256,550. Patented Feb. 19, 1918.
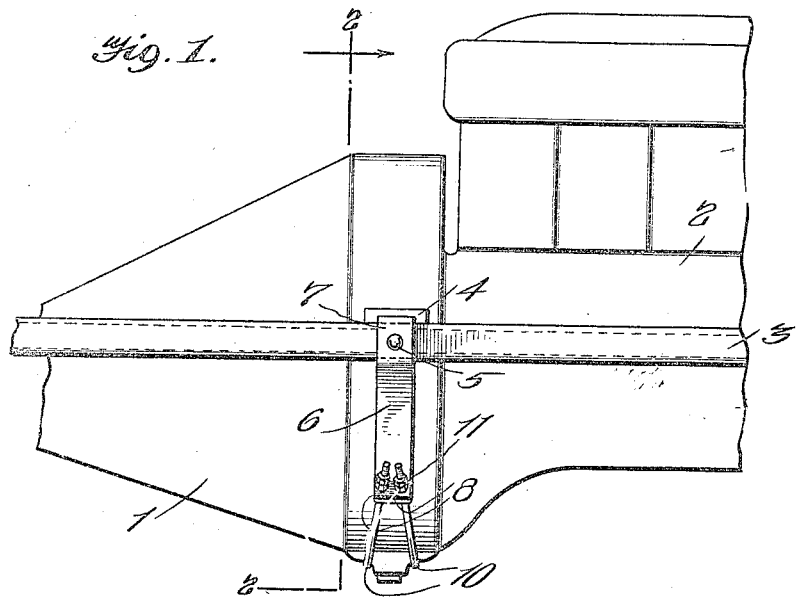
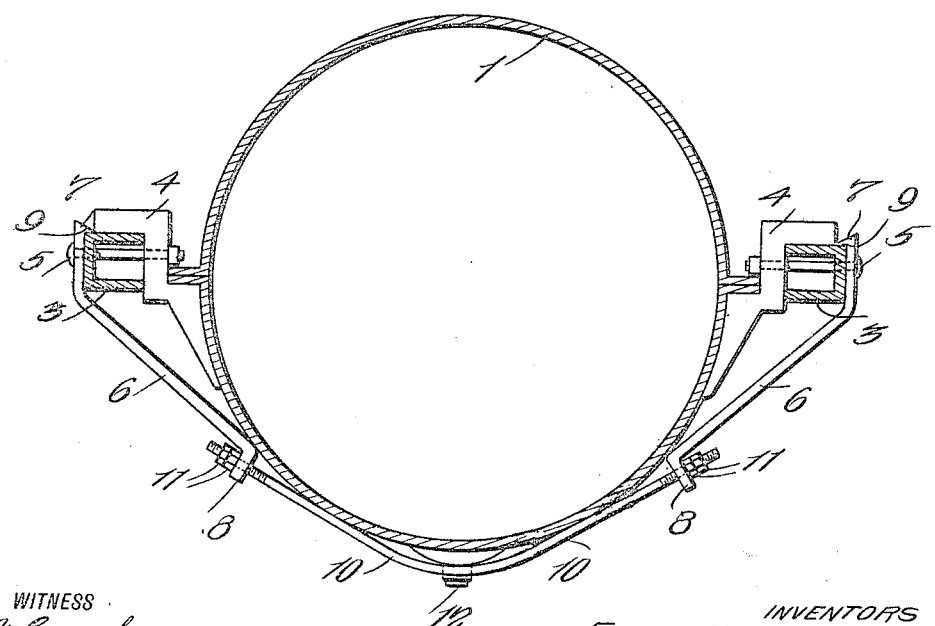
WITNESS
E. M. Callaghan
INVENTORS
FRANK A. GOOLD,
WILLIAM G. BAXTER,
BY
Munn & Co.
ATTORNEYS

UNITED STATES PATENT OFFICE.

FRANK ARTHUR GOOLD AND WILLIAM GRANT BAXTER, OF MONTFORT, WISCONSIN.

CRANK-CASE SUPPORT.

1,256,550.

Specification of Letters Patent.  Patented Feb. 19, 1918.

Application filed September 12, 1917.  Serial No. 190,989.

*To all whom it may concern:*

Be it known that we, FRANK ARTHUR GOOLD and WILLIAM GRANT BAXTER, citizens of the United States, and residents of Montfort, in the county of Grant and State of Wisconsin, have invented new and useful Improvements in Crank-Case Supports, of which the following is a specification.

Our invention is an improvement in crank case supports, and has for its object to provide a support of the character specified adapted for attachment to Ford cars for supporting the crank case against downward movement, wherein the support is connected to the frame of the vehicle and to the supporting arms for the crank case.

In the drawings:

Figure 1 is a partial side view of the crank case of the motor vehicle showing the support in use;

Fig. 2 is a section on the line 2—2 of Fig. 1, looking in the direction of the arrow adjacent to the line.

The present embodiment of the invention is shown in connection with the crank case 1 of a motor vehicle 2, and the attachment is connected to the channel bars 3 of the frame and to the supporting arms 4 for the crank case, which engage over the channel bars as shown and are connected to the bars by bolts and nuts 5.

The support comprises a pair of similar plates, each consisting of a body 6 having its ends bent angularly as shown at 7 and 8, respectively. The end 7 is adapted to engage outside of the adjacent channel bar and over the same, the said end 7 having a catch 9 for this purpose. This end of each plate is provided with an opening, adapted to register with the openings through a channel bar and arm 4, and the bolt 5 is passed through the said openings. The lower angular end 8 of each plate has an opening, and through the openings of the plates are passed the threaded ends of rods 10, the said rods being bent, as shown, to conform roughly with the curvature of the crank case, and nuts 11 are threaded onto the ends of each rod outside of the angular ends 8. The rods 10 fit on opposite sides of the drainage boss 12 on the bottom of the crank case, and it will be evident that by turning the nuts the adjustment may be varied to attain the proper degree of tension.

The improved support is easily attached, and, once attached, requires no attention, since it is firmly held by the bolts 5 and the nuts 11. Should the support become loose it may be tightened by the nuts 11.

We claim:

In a motor vehicle, the combination with a crank case having supporting arms and a frame comprising channel bars, of a support for the crank case connected to the channel bars of the frame and extending beneath the crank case and having means for tightening the same, said support comprising plates at the opposite sides of the crank case, each plate having its ends bent angularly, and one end having a catch for engaging over the adjacent channel bar, said ends of the plates being secured to the channel bars and the supporting arms of the crank case, rods having their ends bent to conform approximately with the curvature of the crank case and extending beneath the same, the other angular ends of the plates having openings through which the rods extend, and nuts engaging the rods.

FRANK ARTHUR GOOLD.
WILLIAM GRANT BAXTER.

Witnesses:
DAVID JAMES,
J. C. MASON.